(12) United States Patent
Friedman (10) Patent No.: US 9,332,310 B2
(45) Date of Patent: *May 3, 2016

(54) SYSTEM AND METHOD OF SELECTING A MULTIMEDIA STREAM

(71) Applicant: AT&T INTELLECTUAL PROPERTY I, L.P., Atlanta, GA (US)

(72) Inventor: Lee Friedman, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/610,484

(22) Filed: Jan. 30, 2015

(65) Prior Publication Data

US 2015/0150063 A1 May 28, 2015

Related U.S. Application Data

(63) Continuation of application No. 13/098,775, filed on May 2, 2011, now Pat. No. 8,978,078.

(51) Int. Cl.

| | |
|---|---|
| *H04N 7/173* | (2011.01) |
| *H04N 21/442* | (2011.01) |
| *H04H 20/26* | (2008.01) |
| *H04H 20/42* | (2008.01) |
| *H04H 60/32* | (2008.01) |
| *H04N 21/438* | (2011.01) |
| *H04N 21/6405* | (2011.01) |
| *H04N 7/10* | (2006.01) |
| *H04N 21/24* | (2011.01) |
| *H04N 21/436* | (2011.01) |
| *H04H 20/22* | (2008.01) |

(52) U.S. Cl.
CPC ......... *H04N 21/44209* (2013.01); *H04H 20/26* (2013.01); *H04H 20/423* (2013.01); *H04H 60/32* (2013.01); *H04N 7/106* (2013.01); *H04N 7/17336* (2013.01); *H04N 21/2402* (2013.01); *H04N 21/4383* (2013.01); *H04N 21/43615* (2013.01); *H04N 21/6405* (2013.01); *H04H 20/22* (2013.01)

(58) Field of Classification Search
CPC ............... H04N 7/17318; H04N 21/47202
USPC ...................................... 725/93–95
See application file for complete search history.

(56) References Cited

U.S. PATENT DOCUMENTS

| | | | | |
|---|---|---|---|---|
| 8,621,500 B2* | 12/2013 | Weaver | ............... | H04L 43/0882 725/10 |
| 2009/0060028 A1* | 3/2009 | Liu | .................. | H04N 21/43615 375/240.01 |
| 2010/0005499 A1* | 1/2010 | Covey | ................. | H04L 12/1827 725/109 |
| 2011/0126247 A1* | 5/2011 | Howarter | ........... | H04N 7/17318 725/95 |

(Continued)

*Primary Examiner* — Sumaiya A Chowdhury
(74) *Attorney, Agent, or Firm* — Toler Law Group, PC (57) ABSTRACT

A method includes receiving, at a server, channel change request data from a media device. The channel change request data specifies a requested channel that is associated with a plurality of multimedia streams. Each multimedia stream of the plurality of multimedia streams has a corresponding content format. The method includes determining, at the server, an available bandwidth of a service to a premises associated with the media device. The method includes selecting, at the server, a particular content format based on the available bandwidth and a multimedia stream of the plurality of multimedia streams that has the particular content format. The method also includes sending an identification of the multimedia stream from the server to the media device.

20 Claims, 7 Drawing Sheets

(56) References Cited

U.S. PATENT DOCUMENTS

2011/0162013 A1* 6/2011 Bagasra .............. H04L 12/2807
725/74

2011/0258665 A1* 10/2011 Fahrny ............... H04N 21/4334
725/47

2012/0230655 A1* 9/2012 Potrebic ............. H04N 5/44543
386/297

* cited by examiner

| Channel | Stream Channel No. | Stream Content Format | Stream Multicast Address |
|---|---|---|---|
| NewsTV | 1 | SD | 10.29.253.1 |
| | 1001 | HD | 10.29.254.1 |
| ScienceTV | 2 | SD | 10.29.253.2 |
| | 1002 | HD | 10.29.254.2 |
| SportsTV | 3 | SD | 10.29.253.3 |
| | 1003 | HD | 10.29.254.3 |
| | 2003 | 3-D | 10.29.255.3 |

SYSTEM AND METHOD OF SELECTING A MULTIMEDIA STREAM

CROSS-REFERENCE TO RELATED APPLICATION

This application claims priority from, and is a continuation of, U.S. patent application Ser. No. 13/098,775, filed on May 2, 2011, which is incorporated herein by reference in its entirety.

FIELD OF THE DISCLOSURE

The present disclosure is generally related to selecting a multimedia stream.

BACKGROUND

Recent advances in technology have seen an increase in the number of television channels available to a viewer. Some television systems provide a user with access to both a standard-definition (SD) version and a high-definition (HD) version of a particular channel. Typically, the SD version of the channel is mapped to a different channel number than the HD version of the channel. For example, the SD version of a channel may be available at channel number 654, whereas the HD version of the channel may be available at channel number 1654. However, this bifurcated channel mapping may make it difficult for a user to quickly assess television programming that is available at a particular time. For example, some channels may only be available in SD, other channels may only be available in HD, and still other channels may be available in both SD and HD. This may lead to redundant listings in an electronic program guide. In addition, some users may not realize that an HD version of a particular channel is available for viewing on their high definition television (HDTV). Instead, such users may watch the SD version of the particular channel, failing to take advantage of the HD capability of their television.

DETAILED DESCRIPTION

Systems and methods of managing multimedia streams are disclosed. For example, a multimedia stream may be an Internet protocol television (IPTV) multicast stream, a cable television stream, a satellite television stream, or another type of multimedia stream selected via a channel proxy mechanism. When a user selects a particular channel, a channel change request that is generated in response to the channel selection may be intercepted by a proxy. For example, the proxy may be located at the user's set-top box, at a residential gateway, or upstream at a server maintained by a television service provider. The proxy may select a particular multimedia stream of the channel based on a state of a service (e.g., IPTV service) to a premises (e.g., customer premises such as a home or an office) of the set-top box. For example, when a customer subscribes to an IPTV service, bandwidth limitations may restrict the customer's home from concurrently receiving more than a particular number of SD and HD multicast streams. Depending on SD and HD bandwidth availability, the proxy may select a particular multicast stream for viewing. Alternatively, or in addition, the multicast stream may be selected based on an output setting of the set-top box. For example, if the set-top box is connected to a non-HDTV, an SD stream of the requested channel may be selected.

When a digital video recorder (DVR) at or coupled to the set-top box generates the channel change request (e.g., at the start of a scheduled recording), the multimedia stream may be selected based on what other recordings are already in progress at the DVR and on available storage space at the DVR. The disclosed techniques may also be applied to content formats other than an SD content format and an HD content format, such as a three-dimensional (3-D) content format and an audio-only (e.g., music-on-demand) content format.

In a particular embodiment, a method includes detecting a channel change request at a set-top box. The channel change request specifies a requested channel that is associated with a plurality of multimedia streams. Each multimedia stream has a corresponding content format (e.g., a standard definition content format, a high definition content format, a three-dimensional content format, etc.). The method also includes selecting a particular multimedia stream based on an available bandwidth of a service to a premises of the set-top box to identify a selected multimedia stream. For example, the service may be an IPTV service, a cable TV service, a satellite TV service, or another content service. The selected multimedia stream may be received by the set-top box and transmitted to a display device to complete the channel change request.

In another particular embodiment, an apparatus includes a network interface configured to communicate with a distribution network, an output interface configured to communicate with a display device, a processor, and a memory coupled to the processor. The memory stores instructions executable by the processor to detect a channel change request, where the channel change request specifies a requested channel that is associated with a plurality of multimedia streams, where each multimedia stream has a corresponding content format. The instructions are also executable by the processor to select a particular multimedia stream of the plurality of multimedia streams based on an output setting of the output interface to identify a selected multimedia stream. The instructions are further executable by the processor to transmit a request for the selected multimedia stream via the network interface. In an exemplary embodiment, the apparatus is integrated into an Internet protocol television (IPTV) set-top box and the multimedia stream is an IPTV multicast stream.

In another particular embodiment, a tangible (i.e., non-transitory) computer-readable medium stores instructions executable by a computer to receive, at a channel proxy server, a channel change request issued from a set-top box. The channel change request specifies a requested channel that is associated with a plurality of multicast streams, where each multicast stream of the plurality of multicast streams has a corresponding content format. The instructions are also executable by the computer to determine an available bandwidth of a service to a premises of the set-top box and to select a content format based on the available bandwidth. The instructions are further executable by the computer to select a multicast stream of the plurality of multicast streams that is associated with the selected content format and to transmit an identification of the selected multicast stream to the set-top box.

Figure 1:
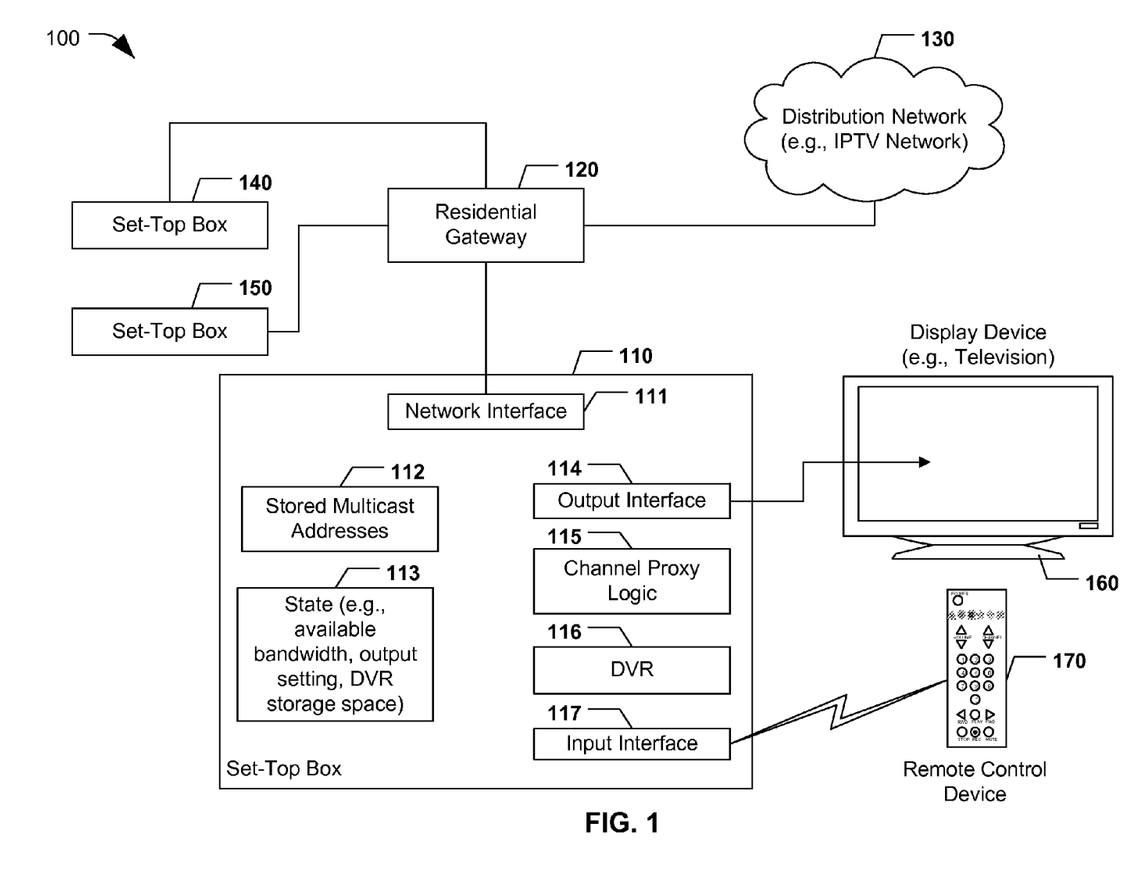
FIG. 1 is a diagram of a particular embodiment of a system to select a multimedia stream.

FIG. 1 is a diagram of a particular embodiment of a system 100 to select a multimedia stream. The system 100 includes a set-top box 110 that is operable to receive multimedia content via a distribution network 130.

The set-top box 110 may receive one or more multimedia streams from the distribution network 130 and may transmit the one or more received multimedia streams for display to a display device 160 (e.g., a television). For example, a network interface 111 of the set-top box 110 may be configured to communicate with a service (e.g., a terrestrial, satellite, cable, or IPTV service) via the distribution network 130. The network interface 111 may be a wired or wireless network interface, such as an Ethernet interface, an Institute of Electrical and Electronics Engineers (IEEE) 802.11 interface, a coaxial interface, another interface, or any combination thereof. In a particular embodiment, the network interface 111 is communicatively coupled to the distribution network 130 via a residential gateway 120. The residential gateway 120 may also be coupled to additional set-top boxes 140, 150. For example, the residential gateway 120 and the set-top boxes 110, 140, and 150 may be located at a customer premises (e.g., a subscriber home or office).

The set-top box 110 may include a wired or wireless output interface 114 and a wired or wireless input interface 117. For example, the output interface 114 may include a high-definition multimedia interface (HDMI), a digital visual interface (DVI), a separate video (s-video) interface, a component video interface, a coaxial interface, a composite video interface, an optical or other audio interface, another output interface, or any combination thereof. In a particular embodiment, the output interface 114 transmits multimedia content to the display device 160. The input interface 117 may be configured to receive commands from one or more input devices (e.g., an illustrative remote control device 170). For example, a user may enter a channel number, a channel up command, a channel down command, a previous channel command, or a command to select a particular channel of an electronic program guide into the remote control device 170, resulting in a channel change request at the set-top box 110. Alternately, the user may use the remote control device 170 to set up a reminder event at the set-top box 110. To illustrate, the user may set up a reminder event for 10 p.m. with respect to the channel "SportsTV." At 10 p.m., the set-top box 110 may generate a channel change request when automatically changing channels to "SportsTV."

The set-top box 110 may also include channel proxy logic 115 that detects and intercepts channel change requests before the channel change requests are communicated to the distribution network 130. Channel change requests may be detected based on user input (e.g., via the remote control device 170), may be generated by reminder events as described above, or may be generated by a digital video recorder (DVR) 116. For example, the DVR 116 may issue the channel change request at the start of a scheduled recording. The channel change request may specify a requested channel that is associated with a plurality of multimedia streams. For example, multiple streams of the requested channel may be available via the service, where each stream has a corresponding content format (e.g., a standard-definition (SD) content format, a high-definition (HD) content format, and a three-dimensional (3-D) content format).

When the channel proxy logic 115 intercepts a channel change request for a channel, the channel proxy logic 115 may determine whether the channel is associated with multiple streams. For example, the channel proxy logic 115 may access channel mapping data, where the channel mapping data maps each available channel (e.g., television network) to channel numbers and content formats. A particular embodiment of channel mapping data is further described with reference to FIG. 4. In response to intercepting a channel change request for a channel that has multiple available streams, the channel proxy logic 115 may determine a state 113 to determine which of the multiple available streams to select. In a particular embodiment, the state 113 includes data representing an output setting of the set-top box 110. For example, the output setting of the set-top box 110 may be an SD output setting (e.g., indicating that the display device 160 is an SD television (SDTV)), an HD output setting (e.g., indicating that the display device 160 is an HD television (HDTV)), a 3-D output setting (e.g., indicating that the display device 160 is a 3-D television (3DTV)), or any combination thereof. When the output setting indicates that the display device 160 is an SDTV, the channel proxy logic 115 may select an SD stream of a requested channel instead of an HD stream or a 3-D stream of the requested channel. Similarly, the channel proxy logic 115 may select an HD stream or a 3-D stream when the output setting indicates that the display device 160 is an HDTV or a 3DTV, respectively.

In a particular embodiment, the state 113 includes other information that is useable, instead of or in addition to the output setting of the set-top box 110, to select a multimedia stream of a requested channel. For example, the state 113 may include an available bandwidth of the service to the premises of the set-top box 110. To illustrate, hardware, software, or network conditions may limit a customer home from concurrently receiving more than a certain number of SD streams, HD streams, and 3-D streams. When the premises is receiving a maximum number of concurrent HD streams but there is enough bandwidth for an SD stream, the channel proxy logic 115 may select an SD stream of a requested channel rather than an HD stream of the requested channel, even in cases where the output setting of the set-top box 110 indicates that the display device 160 is an HDTV. Conversely, when there is enough bandwidth to receive an HD stream of the requested channel, the channel proxy logic 115 may select the HD stream instead of the SD stream.

In a particular embodiment, the available bandwidth of the service may be determined at the set-top box 110. For example, the set-top box 110 may have access to data indicating what streams are being received at the other set-top boxes 140 and 150, and the available bandwidth may be determined by subtracting the bandwidth of each multimedia stream being received at any of the set-top boxes 110, 140, and 150 from a total bandwidth available to the premises. Alternatively, the available bandwidth may be determined at the residential gateway 120 and the set-top box 110 may receive a notification from the residential gateway 120, where the notification indicates the available bandwidth of the service. For example, when the set-top boxes 110, 140, and 150 share network resources, the residential gateway 120 may be responsible for allocating the network resources to the set-top boxes 110, 140, and 150. The residential gateway 120 may calculate the available bandwidth of the service by subtracting a bandwidth of each multimedia stream being received at any of the set-top boxes 110, 140, and 150 from a threshold bandwidth to be shared by all of the set-top boxes 110, 140, and 150. In a particular embodiment, each of the set-top boxes 110, 140, and 150 includes channel proxy logic 115. In an alternate embodiment, the channel proxy logic 115 may be implemented at the residential gateway 120, and the residential gateway 120 may intercept channel change requests issued by the set-top boxes 110, 140, and 150 and select streams corresponding to channels.

In another example, the state 113 may include information about the DVR 116. To illustrate, the state 113 may identify an amount of remaining storage space at the DVR 116 or at a storage device coupled to the DVR 116. In another illustrative example, the state 113 may identify content formats (e.g., SD, HD, or 3-D) of recordings being performed or scheduled at the DVR 116. The information about the DVR 116 may also be used by the channel proxy logic 115 to determine which stream of a requested channel to select.

For example, the DVR 116 may issue a channel change request at the start of a program that is scheduled to be recorded in HD (i.e., an HD version of the requested channel is to be recorded). However, the state 113 may indicate that the DVR 116 does not have enough storage space to accommodate the HD version of the program, although the DVR 116 has enough storage space to accommodate an SD version of the program. To illustrate, respective file sizes of the HD version of the program and the SD version of the program may be estimated and compared to the available storage space at the DVR 116. The HD file size may be determined by multiplying an HD bitrate of the program by a running time of the program, and the SD file size may be determined by multiplying an SD bitrate of the program by the running time of the program. When the available storage space at the DVR 116 is less than the HD file size but greater than or equal to the SD file size, the channel proxy logic 115 may select the SD version of the channel so that the recording may successfully be completed. Alternatively, the state 113 may indicate that the premises is already receiving the maximum number of HD multimedia streams, and the channel proxy logic 115 may select the SD version of the channel so that the recording may successfully be completed.

After the channel proxy logic 115 has selected a particular multimedia stream of a requested channel based on the state 113, the network interface 111 may transmit a multimedia stream request specifying the selected multimedia stream to the service via the distribution network 130. Alternately, the network interface 111 may tune to the selected multimedia stream. When the selected multimedia stream is received, the selected multimedia stream may be transmitted to the display device 160 and/or provided to the DVR 116, thereby completing the channel change request. In a particular embodiment where the distribution network 130 is an IPTV network, the selected multimedia stream may be an IPTV multicast stream and the request specifying the selected multimedia stream may be a multicast join request. For example, the multicast join request may include information identifying the selected multicast stream (e.g., a multicast address of the selected multicast stream). In a particular embodiment, the set-top box 110 stores multicast addresses for a plurality of available multicast streams (e.g., as stored multicast addresses 112). For example, the stored multicast addresses 112 may include addresses for each stream of each television channel that is listed in an electronic program guide downloaded to the set-top box 110. In an illustrative embodiment, the stored multicast addresses 112 include the channel mapping data illustrated in FIG. 4.

During operation, the channel proxy logic 115 may detect a channel change request based on user input or based on operation of the DVR 116. The channel change request may specify a requested channel that is associated with more than one multimedia stream. For example, each multimedia stream may be associated with a different content format, such as SD, HD, 3-D, or some other content format. The channel proxy logic 115 may select a particular multimedia stream corresponding to the requested channel based on the state 113, where the state 113 indicates an available bandwidth of a service (e.g., IPTV service) to a premises of the set-top box 110, an output setting of the set-top box 110, an available storage space at the DVR 116, a recording schedule of the DVR 116, other configuration or state information, or any combination thereof. The selected multimedia stream may be accessed to complete the channel change request. For example, the selected multimedia stream may be requested from the distribution network 130.

Thus, the system 100 of FIG. 1 may reduce user confusion that may result from being offered multiple available versions of a particular channel. When the user selects a channel for viewing, the system 100 of FIG. 1 may automatically select a "best available" version of the channel based on factors such as available bandwidth and output setting. The system 100 of FIG. 1 may also enable the user to override this "best available" selection (e.g., via additional user input at the remote control device 170). For example, the "best available" stream may be selected in the following decreasing order of preference: 3-D, HD, SD, and audio-only. Accordingly, the system 100 of FIG. 1 may enable a more pleasant television viewing experience. For example, instead of seeing an "All HD Streams in Use" message and concluding that it is not possible to view a desired channel, the user may automatically be provided with an SD version of a requested channel along with a visual message explaining why the SD version was selected.

Figure 2:
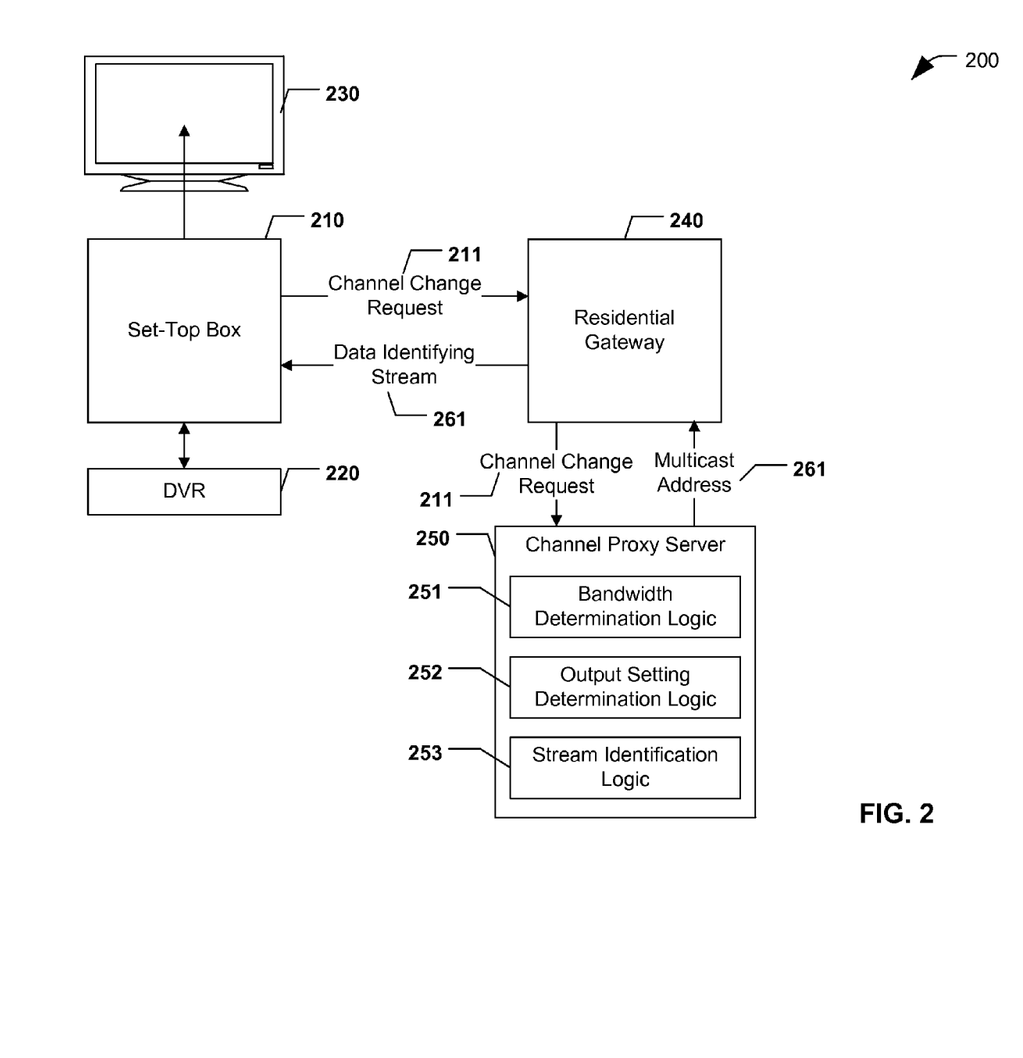
FIG. 2 is a diagram of another particular embodiment of a system to select a multimedia stream.

The system 100 of FIG. 1 may implement channel proxy functionality at the set-top box without intervention of a service provider. In some embodiments, all of or a portion of the channel proxy functionality may be implemented at an upstream channel proxy server (e.g., a multicast proxy server) of the service provider. For example, FIG. 2 is a diagram of a particular embodiment of a system 200 including a channel proxy server 250 operable to select a multimedia stream.

The system 200 may include a plurality of set-top boxes (e.g., including representative set top box 210) communicatively coupled to the channel proxy server 250 via one of a plurality of residential gateways (e.g., including representative residential gateway 240). In an illustrative embodiment, the set-top box 210 may be the set-top box 110 of FIG. 1 and the residential gateway 240 may be the residential gateway 120 of FIG. 1. The set-top box 210 may be coupled to a display device 230 and to an external DVR 220. For example, the external DVR 220 may be shared by each set-top box at a customer premises. Alternately, one of the set-top boxes at a customer premises may include the DVR 220, and the DVR 220 may be shared by each of the set set-top boxes at the customer premises.

The channel proxy server 250 may receive channel change requests issued from set-top boxes that are served by the channel proxy server 250. For example, the channel proxy server 250 may receive a channel change request 211 from the set-top box 210. The channel change request 211 may specify a requested channel, where the requested channel is associated with multimedia streams having different content formats, such as an SD content format, an HD content format, and a 3-D content format. The channel proxy server 250 may include logic to determine which multimedia stream of the requested channel should be provided to the set-top box 210 to implement the channel change request 211. For example, the channel proxy server 250 may include bandwidth determination logic 251 configured to determine an available bandwidth of a service to a premises of the set-top box 210 and output setting determination logic 252 configured to determine an output setting of the set-top box 210. In a particular embodiment, the bandwidth determination logic 251 may receive periodic notifications that include data representing the available bandwidth from the residential gateway 240. The output setting determination logic 252 may receive periodic notifications that include data representing the output setting of the set-top box 210 from the set-top box 210 or from the residential gateway 240.

In a particular embodiment, the channel proxy server 250 may also include logic to determine additional state information, such as available storage space at the DVR 220. Based on factors such as the available bandwidth, the output setting, and the available DVR storage space, the channel proxy server 250 may select a particular content format of the requested channel. For example, when the available bandwidth is low, the channel proxy server 250 may select an SD content format. Stream identification logic 253 may identify or select a multimedia stream corresponding to the selected content format. For example, when the multimedia stream is a multicast stream, the stream identification logic 253 may transmit data 261 identifying the multicast stream to the set-top box 210. In a particular embodiment, the set-top box 210 may search a channel mapping table based on the data 261 to identify a multicast address of the stream and may request the multicast stream using the multicast address, thereby completing the channel change request 211. In an alternate embodiment where the set-top box 210 does not have a stored list of multicast addresses, the channel proxy server 250 may request the multicast address of the selected stream from a video head end and transmit the multicast address to the set-top box 210.

Thus, the system 200 of FIG. 2 may provide a centralized channel proxy mechanism that automatically selects a "best available" version of a requested channel on a per set-top box basis based on factors such as available bandwidth and output setting.

Although the descriptions of FIG. 1 and FIG. 2 refer to video content formats such as SD, HD, and 3-D, the disclosed channel proxy mechanism may also be implemented for non-video content. For example, a channel proxy may select a "best-available" audio-only channel (e.g., a music-on-demand channel) based on factors such as available bandwidth and audio output setting. To illustrate, the channel proxy may select between a stereo audio channel and a digital surround audio channel. As another example, a channel proxy may select audio, video, or other content based on processing capability. For example, if a set-top box includes a first set of coder-decoders (codecs) but does not include a second set of codecs, the channel proxy mechanism may select streams that can be decoded using one of the first set of codecs and avoid selecting streams that can only be decoded using one of the second set of codecs.

Figure 3:
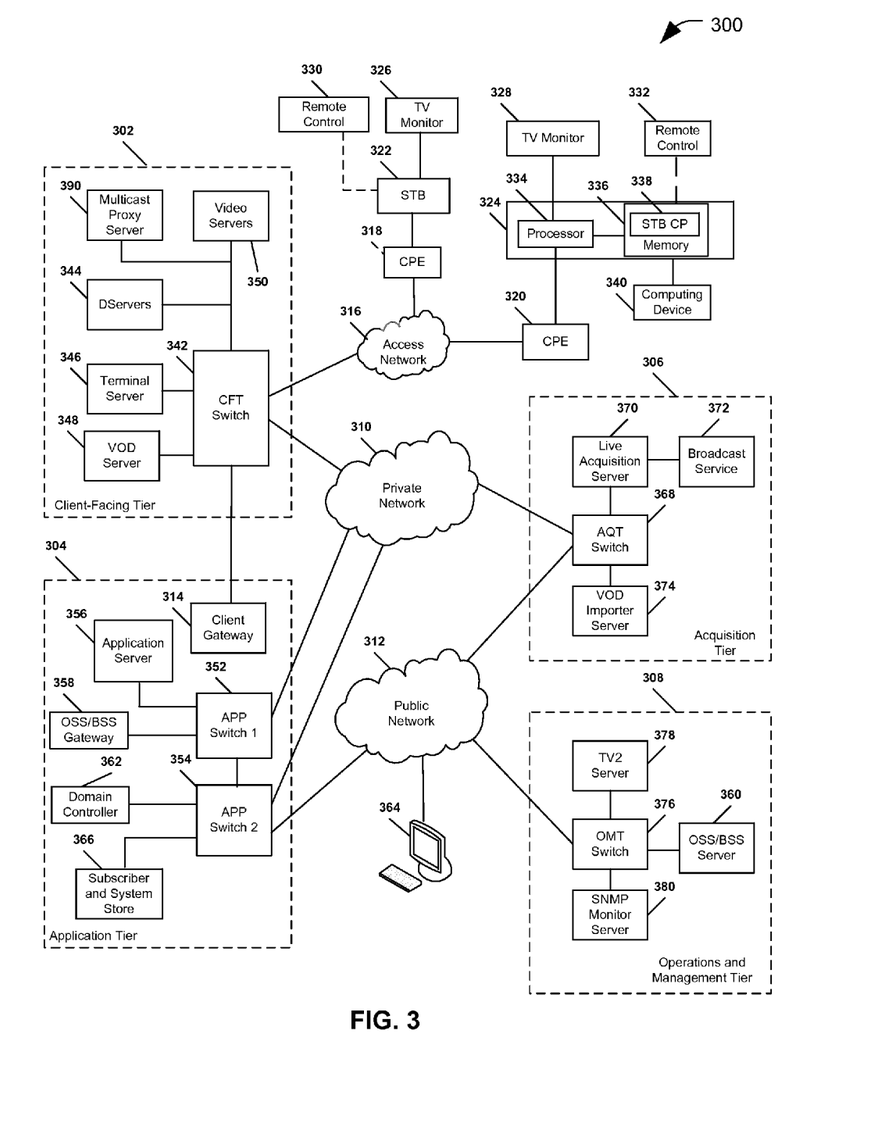
FIG. 3 is a diagram of a particular embodiment of an Internet protocol television (IPTV) system in which the systems of FIG. 1 or FIG. 2 may be integrated.

FIG. 3 illustrates a particular embodiment of an Internet Protocol Television (IPTV) system 300. As shown, the system 300 can include a client facing tier 302, an application tier 304, an acquisition tier 306, and an operations and management tier 308. Each tier 302, 304, 306, 308 is coupled to a private network 310, to a public network 312, such as the Internet, or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 314, can communicate directly with the client-facing tier 302.

The client-facing tier 302 can communicate with user equipment via an access network 316, such as an Internet Protocol Television (IPTV) access network. In an illustrative embodiment, customer premises equipment (CPE) 318, 320 can be coupled to a local switch, router, or other device of the access network 316. The client-facing tier 302 can communicate with a first representative set-top box device 322 at a first customer premise via the first CPE 318 and with a second representative set-top box device 324 at a second customer premise via the second CPE 320. The CPE 318, 320 can include routers, local area network devices, modems, such as digital subscriber line (DSL) modems, residential gateways (e.g., the residential gateway 120 of FIG. 1 or the residential gateway 240 of FIG. 2) any other suitable devices for facilitating communication between a set-top box device and the access network 316, or any combination thereof.

The client-facing tier 302 can be coupled to the CPE 318, 320 via digital subscriber lines, coaxial cables, fiber optic cables, or other connectors. In a particular embodiment, the client-facing tier 302 is coupled to the CPE 318, 320 via fiber optic cables. In another particular embodiment, the CPE 318, 320 are digital subscriber line (DSL) modems that are coupled to one or more network nodes via twisted pairs. The client-facing tier 302 can be coupled to the network nodes via fiber-optic cables or other types of connectors. Each set-top box device 322, 324 can process data received via the access network 316 and via an IPTV software platform.

The first set-top box device 322 can be coupled to a first external display device, such as a first television monitor 326, and the second set-top box device 324 can be coupled to a second external display device, such as a second television monitor 328. Moreover, the first set-top box device 322 can communicate with a first remote control 330, and the second set-top box device 324 can communicate with a second remote control 332. The set-top box devices 322, 324 can include IPTV set-top box devices, video gaming devices or consoles that are adapted to receive IPTV content, personal computers or other computing devices that are adapted to emulate set-top box device functionalities, any other device adapted to receive IPTV content and transmit data to an IPTV system via an access network, or any combination thereof.

In an exemplary, non-limiting embodiment, each set-top box device 322, 324 can receive data, video, or any combination thereof, from the client-facing tier 302 via the access network 316 and render or display the data, video, or any combination thereof, at the television monitor 326, 328 to which it is coupled. In an illustrative embodiment, the set-top box devices 322, 324 can include tuners that receive and decode television programming signals or packet streams for transmission to the television monitors 326, 328. Further, the set-top box devices 322, 324 can include a STB processor 334 and a STB memory device 336 that is accessible to the STB processor 334. In one embodiment, a computer program, such as the STB computer program 338, can be embedded within the STB memory device 336. For example, the STB computer program 338 may include logic, modules, and/or instructions executable by the processor 334 to implement the channel proxy logic 115 of FIG. 1.

In an illustrative embodiment, the client-facing tier 302 can include a client-facing tier (CFT) switch 342 that manages communication between the client-facing tier 302 and the access network 316 and between the client-facing tier 302 and the private network 310. As illustrated in FIG. 3, the CFT switch 342 is coupled to one or more data servers, such as D-servers 344, that store, format, encode, replicate, or otherwise manipulate or prepare video content for communication from the client-facing tier 302 to the set-top box devices 322, 324. The CFT switch 342 can also be coupled to a terminal server 346 that provides terminal devices with a connection point to the private network 310. In a particular embodiment, the CFT switch 342 can be coupled to a video-on-demand (VOD) server 348 that stores or provides VOD content imported by the IPTV system 300. Further, the CFT switch 342 is coupled to one or more video servers 350 that receive video content and transmit the content to the set-top boxes 322, 324 via the access network 316.

In a particular embodiment, the client-facing tier 302 may include a multicast proxy server 390. For example, the multicast proxy server 390 may be the channel proxy server 250 of FIG. 2. The multicast proxy server 390 may implement channel proxy functionality for the set-top boxes 322, 324, as described with reference to the channel proxy server 250 of FIG. 2.

In an illustrative embodiment, the client-facing tier 302 can communicate with a large number of set-top boxes, such as the representative set-top boxes 322, 324, over a wide geographic area, such as a regional area, a metropolitan area, a viewing area, a designated market area or any other suitable geographic area, market area, or subscriber or customer group that can be supported by networking the client-facing tier 302 to numerous set-top box devices. In a particular embodiment, the CFT switch 342, or any portion thereof, can include a multicast router or switch that feeds one or more video streams from a video server to multiple set-top box devices.

As illustrated in FIG. 3, the application tier 304 can communicate with both the private network 310 and the public network 312. The application tier 304 can include a first application tier (APP) switch 352 and a second APP switch 354. In a particular embodiment, the first APP switch 352 can be coupled to the second APP switch 354. The first APP switch 352 can be coupled to an application server 356 and to an OSS/BSS gateway 358. In a particular embodiment, the application server 356 can provide applications to the set-top box devices 322, 324 via the access network 316, which enable the set-top box devices 322, 324 to provide functions, such as display, messaging, processing of IPTV data and VOD material, etc. In a particular embodiment, the OSS/BSS gateway 358 includes operation systems and support (OSS) data, as well as billing systems and support (BSS) data. In one embodiment, the OSS/BSS gateway 358 can provide or restrict access to an OSS/BSS server 360 that stores operations and billing systems data.

The second APP switch 354 can be coupled to a domain controller 362 that provides Internet access, for example, to users at their computers 364 via the public network 312. For example, the domain controller 362 can provide remote Internet access to IPTV account information, e-mail, personalized Internet services, or other online services via the public network 312. In addition, the second APP switch 354 can be coupled to a subscriber and system store 366 that includes account information, such as account information that is associated with users who access the IPTV system 300 via the private network 310 or the public network 312. In an illustrative embodiment, the subscriber and system store 366 can store subscriber or customer data and create subscriber or customer profiles that are associated with IP addresses of corresponding set-top box devices 322, 324.

In a particular embodiment, the application tier 304 can include a client gateway 314 that communicates data directly to the client-facing tier 302. In this embodiment, the client gateway 314 can be coupled directly to the CFT switch 342. The client gateway 314 can provide user access to the private network 310 and the tiers coupled thereto. In an illustrative embodiment, the set-top box devices 322, 324 can access the IPTV system 300 via the access network 316, using information received from the client gateway 314. User devices can access the client gateway 314 via the access network 316, and the client gateway 314 can allow such devices to access the private network 310 once the devices are authenticated or verified. Similarly, the client gateway 314 can prevent unauthorized devices, such as hacker computers or stolen set-top box devices, from accessing the private network 310, by denying access to these devices beyond the access network 316.

For example, when the first representative set-top box device 322 accesses the client-facing tier 302 via the access network 316, the client gateway 314 can verify subscriber information by communicating with the subscriber and system store 366 via the private network 310. Further, the client gateway 314 can verify billing information and status by communicating with the OSS/BSS gateway 358 via the private network 310. In one embodiment, the OSS/BSS gateway 358 can transmit a query via the public network 312 to the OSS/BSS server 360. After the client gateway 314 confirms subscriber and/or billing information, the client gateway 314 can allow the set-top box device 322 to access IPTV content and VOD content at the client-facing tier 302. If the client gateway 314 cannot verify subscriber information for the set-top box device 322, e.g., because it is connected to an unauthorized twisted pair, the client gateway 314 can block transmissions to and from the set-top box device 322 beyond the access network 316.

As indicated in FIG. 3, the acquisition tier 306 includes an acquisition tier (AQT) switch 368 that communicates with the private network 310. The AQT switch 368 can also communicate with the operations and management tier 308 via the public network 312. In a particular embodiment, the AQT switch 368 can be coupled to a live acquisition server 370 that receives or acquires television content, movie content, advertisement content, other video content, or any combination thereof, from a broadcast service 372, such as a satellite acquisition system or satellite head-end office. In a particular embodiment, the live acquisition server 370 can transmit content to the AQT switch 368, and the AQT switch 368 can transmit the content to the CFT switch 342 via the private network 310.

In an illustrative embodiment, content can be transmitted to the D-servers 344, where it can be encoded, formatted, stored, replicated, or otherwise manipulated and prepared for communication from the video server(s) 350 to the set-top box devices 322, 324. The CFT switch 342 can receive content from the video server(s) 350 and communicate the content to the CPE 318, 320 via the access network 316. The set-top box devices 322, 324 can receive the content via the CPE 318, 320, and can transmit the content to the television monitors 326, 328. In an illustrative embodiment, video or audio portions of the content can be streamed to the set-top box devices 322, 324.

Further, the AQT switch 368 can be coupled to a video-on-demand importer server 374 that receives and stores television or movie content received at the acquisition tier 306 and communicates the stored content to the VOD server 348 at the client-facing tier 302 via the private network 310. Additionally, at the acquisition tier 306, the video-on-demand (VOD) importer server 374 can receive content from one or more VOD sources outside the IPTV system 300, such as movie studios and programmers of non-live content. The VOD importer server 374 can transmit the VOD content to the AQT switch 368, and the AQT switch 368, in turn, can communicate the material to the CFT switch 342 via the private network 310. The VOD content can be stored at one or more servers, such as the VOD server 348.

When users issue requests for VOD content via the set-top box devices 322, 324, the requests can be transmitted over the access network 316 to the VOD server 348, via the CFT switch 342. Upon receiving such requests, the VOD server 348 can retrieve the requested VOD content and transmit the content to the set-top box devices 322, 324 across the access network 316, via the CFT switch 342. The set-top box devices 322, 324 can transmit the VOD content to the television monitors 326, 328. In an illustrative embodiment, video or audio portions of VOD content can be streamed to the set-top box devices 322, 324.

FIG. 3 further illustrates that the operations and management tier 308 can include an operations and management tier (OMT) switch 376 that conducts communication between the operations and management tier 308 and the public network 312. In the embodiment illustrated by FIG. 3, the OMT switch 376 is coupled to a TV2 server 378. Additionally, the OMT switch 376 can be coupled to an OSS/BSS server 360 and to a simple network management protocol (SNMP) monitor 380 that monitors network devices within or coupled to the IPTV system 300. In a particular embodiment, the OMT switch 376 can communicate with the AQT switch 368 via the public network 312.

In an illustrative embodiment, the live acquisition server 370 can transmit content to the AQT switch 368, and the AQT switch 368, in turn, can transmit the content to the OMT switch 376 via the public network 312. In this embodiment, the OMT switch 376 can transmit the content to the TV2 server 378 for display to users accessing the user interface at the TV2 server 378. For example, a user can access the TV2 server 378 using a personal computer (PC) 364 coupled to the public network 312.

Figure 4:
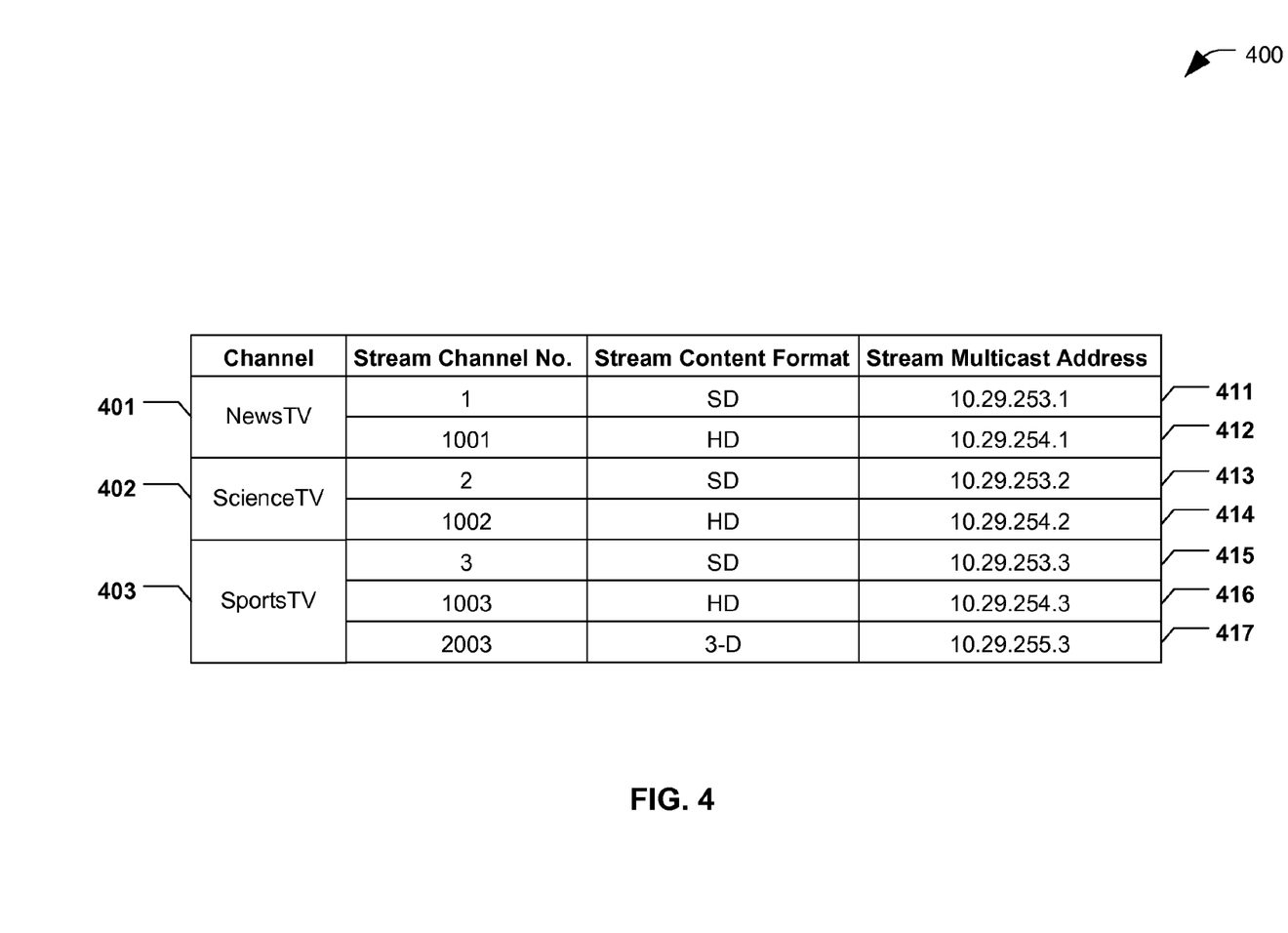
FIG. 4 is a diagram illustrating a particular embodiment of channel mapping data.

FIG. 4 is a diagram illustrating a particular embodiment of channel mapping data 400. The channel mapping data 400 may map channels to streams, channel numbers, content formats, multicast addresses, or any combination thereof. In an illustrative embodiment, the channel mapping data 400 may be stored at one or more of a set-top box (e.g., as the stored multicast addresses 112 of FIG. 1), at a channel proxy server (e.g., the channel proxy server 250 of FIG. 2), and a video head end.

The channel mapping data 400 may identify streams associated with each channel (e.g., television network) accessible by a set-top box. For example, the channel mapping data 400 may identify streams associated with a NewsTV channel 401 a ScienceTV channel 402, and a SportsTV channel 403. The channel mapping data 400 may include a corresponding channel number and a content format of each stream. In an embodiment where the channels are provided via a multicast distribution network, each stream may be associated with a corresponding multicast address that is identified in the channel mapping data 400. Although FIG. 4 depicts Internet Protocol (IP) version 4 (IPv4) addresses, the channel mapping data 400 may include IP version 6 (IPv6) addresses or other network address types.

In the embodiment illustrated in FIG. 4, the NewsTV channel 401 is associated with a first stream 411 that corresponds to channel number 1. The first stream 411 has an SD content format and a multicast address 10.29.253.1. To access the first stream 411, a set-top box may issue a multicast join request that includes the address 10.29.253.1. The NewsTV channel 401 may also be associated with a second stream 412 that corresponds to channel number 1001. The second stream 412 has an HD content format and a multicast address 10.29.254.1. When a channel proxy intercepts a channel change request specifying the NewsTV channel 401 (e.g., the channel change request specifies channel number 1 or channel number 1001), the channel proxy may select between the first stream 411 and the second stream 412 based on factors such as available bandwidth, output setting, DVR schedule, and DVR storage space.

The ScienceTV channel 402 may be associated with a third stream 413 (corresponding to channel number 2 having the SD content format and a multicast address 10.29.253.2) and a fourth stream 414 (corresponding to channel number 1002 having the HD content format and a multicast address 10.29.254.2). When a channel proxy intercepts a channel change request specifying the ScienceTV channel 402 (e.g., the channel change request specifies channel number 2 or channel number 1002), the channel proxy may select between the third stream 413 and the fourth stream 414 based on factors such as available bandwidth, output setting, DVR schedule, and DVR storage space.

The SportsTV channel 403 may be associated with a fifth stream 415 (corresponding to channel number 3 having the SD content format and a multicast address 10.29.253.3), a sixth stream 416 (corresponding to channel number 1003 having the HD content format and a multicast address 10.29.254.3), and a seventh stream 417 (corresponding to channel number 2003 having a 3-D content format and a multicast address 10.29.255.3). When a channel proxy intercepts a channel change request specifying the SportsTV channel 403 (e.g., the channel change request specifies channel number 3, channel number 1003, or channel number 2003), the channel proxy may select between the fifth stream 415, the sixth stream 416, and the seventh stream 417 based on factors such as available bandwidth, output setting, DVR schedule, and DVR storage space.

Thus, the channel mapping data 400 of FIG. 4 may map channels to channel numbers, content formats, and multicast addresses. Accordingly, the channel mapping data 400 of FIG. 4 may be used (e.g., by the channel proxy logic 115 of FIG. 1 or the stream identification logic 253 of FIG. 2) to implement channel proxy functionality.

Figure 5:
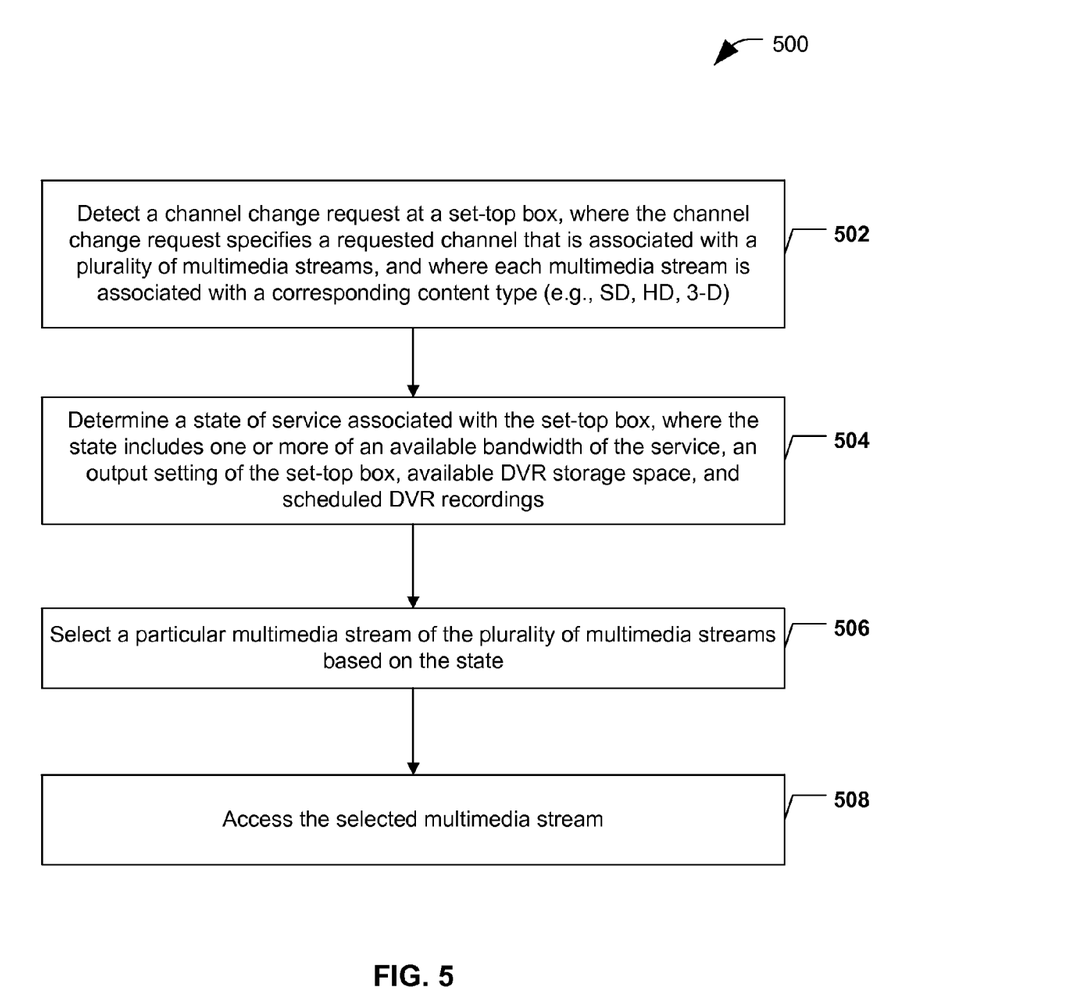
FIG. 5 is a flow chart of a particular embodiment of a method to select a multimedia stream.

FIG. 5 is a flow chart of a particular embodiment of a method 500 to select a multimedia stream. In an illustrative embodiment, the method 500 may be performed at the system 100 of FIG. 1, the system 200 of FIG. 2, or the IPTV system 300 of FIG. 3.

The method 500 may include detecting a channel change request at a set-top box, at 502. The channel change request may specify a requested channel that is associated with a plurality of multimedia streams. Each multimedia stream may be associated with a corresponding content format (e.g., an SD content format, an HD content format, or a 3-D content format). For example, in FIG. 1, the channel proxy logic 115 may detect a channel change request based on input received from the remote control device 170 or based on operation of the DVR 116.

The method 500 may also include determining a state of a service associated with the set-top box, at 504. The state may include one or more of an available bandwidth of the service, an output setting of the set-top box, available DVR storage space, and scheduled DVR recordings. For example, in FIG. 1, the channel proxy logic 115 may determine the state 113.

The method 500 may further include selecting a particular multimedia stream of the plurality of multimedia streams based on the state, at 506, and accessing the selected multimedia stream, at 508. For example, in FIG. 1, the channel proxy logic 115 may select a particular multimedia stream and the set-top box 110 may access the selected multimedia stream (e.g., including transmitting a multimedia stream request specifying the selected multimedia stream to a service provider via the distribution network 130).

Figure 6:
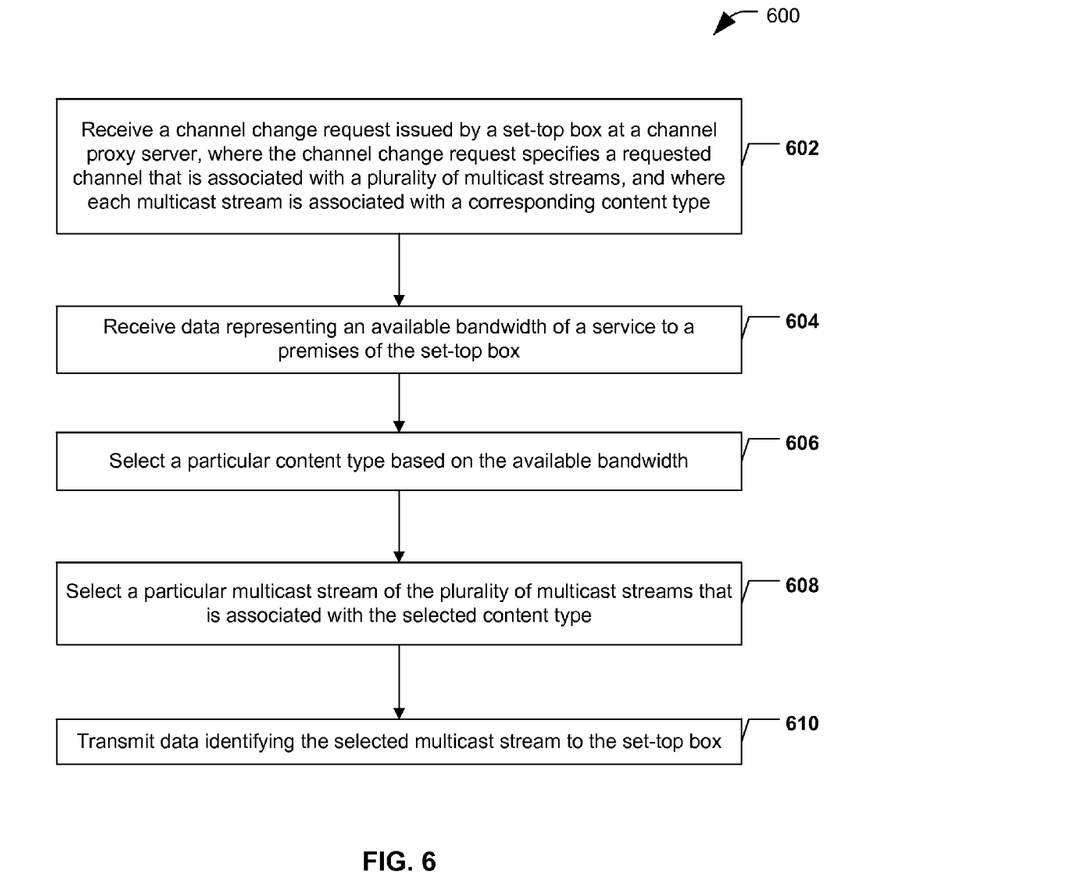
FIG. 6 is a flow chart of another particular embodiment of a method to select a multimedia stream.

FIG. 6 is a flow chart of another particular embodiment of a method 600 to select a multimedia stream. In an illustrative embodiment, the method 600 may be performed at the system 100 of FIG. 1, the system 200 of FIG. 2, or the IPTV system 300 of FIG. 3.

The method 600 may include receiving a channel change request issued by a set-top box at a channel proxy server, at 602. The channel change request may specify a requested channel that is associated with a plurality of multicast streams, where each multicast stream is associated with a corresponding content format. For example, in FIG. 2, the channel proxy server 250 may receive the channel change request 211.

The method 600 may also include receiving data representing an available bandwidth of a service to a premises of the set-top box, at 604, and selecting a particular content format based on the available bandwidth, at 606. For example, in FIG. 2, the bandwidth determination logic 251 may receive data representing the available bandwidth of an IPTV service to a customer home where the set-top box 210 is located, and the channel proxy server 250 may select a particular content format based on the available bandwidth.

The method 600 may further include selecting a particular multicast stream of the plurality of multicast streams that is associated with the selected content format, at 608. For example, in FIG. 2, the channel proxy server 250 may select a particular multicast stream associated with the selected content format. The method 600 may include transmitting data identifying the selected multicast stream to the set-top box, at 610. For example, in FIG. 2, the channel proxy server 250 may transmit the data 261 to the set-top box 210.

Figure 7:
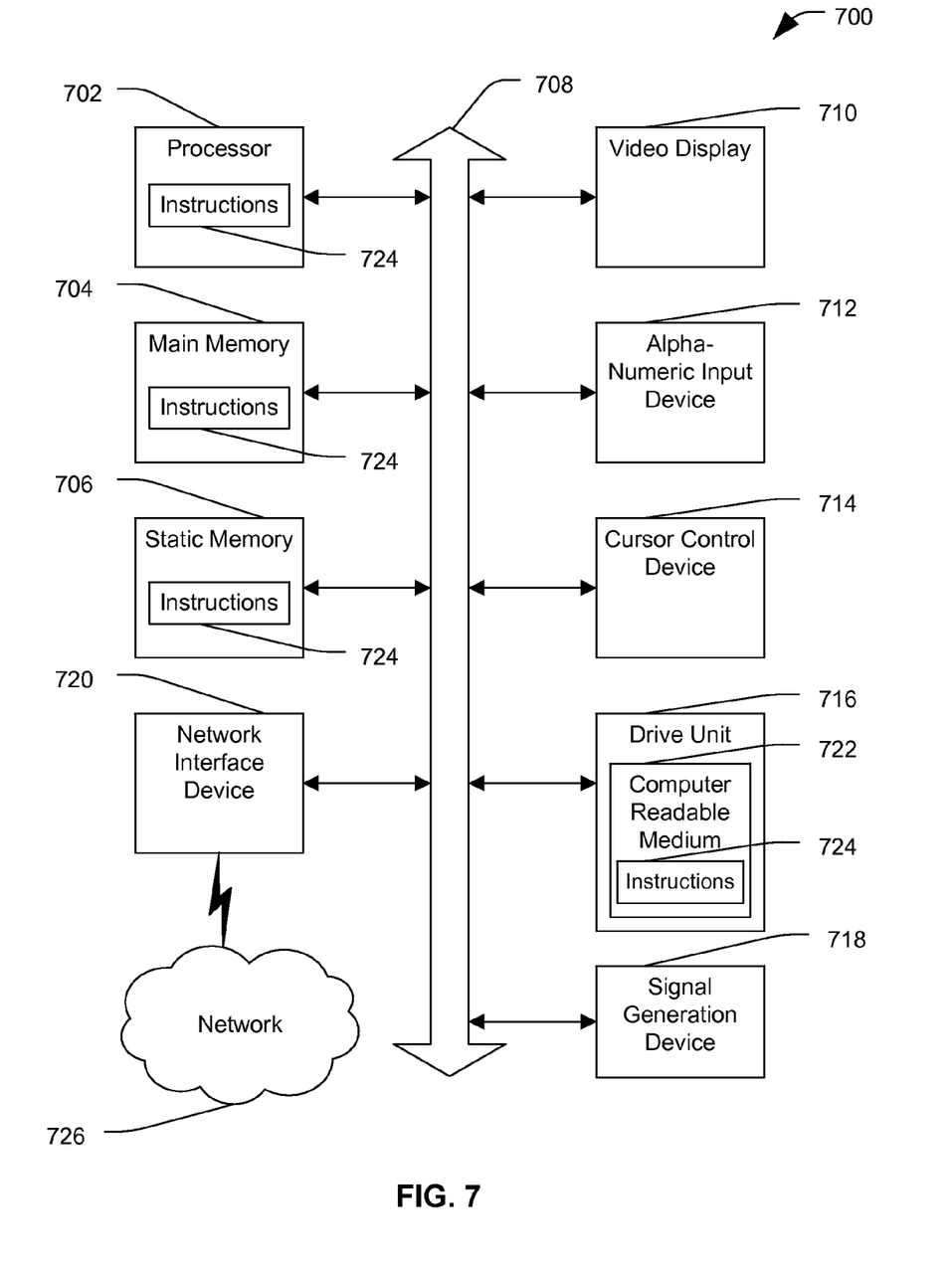
FIG. 7 is a block diagram of an illustrative embodiment of a general computer system.

Referring to FIG. 7, an illustrative embodiment of a general computer system is shown and is designated 700. The computer system 700 includes a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices. For example, the computer system 700 may include or may be included within any one or more of the set-top boxes 110, 140, and 150 of FIG. 1, the residential gateway 120 of FIG. 1, the set-top box 210 of FIG. 2, the DVR 220 of FIG. 2, the residential gateway 240 of FIG. 2, the channel proxy server 250 of FIG. 2, or any combination thereof.

The computer system 700 can also be implemented as or incorporated into various other devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 700 can be implemented using electronic devices that provide audio, video, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include or be coupled to the video display unit 710, such as a liquid crystal display (LCD), an organic light emitting diode (OLED), a flat panel display, a cathode ray tube (CRT) display, a solid-state display, or a projection display. For example, the video display unit may be the display device 160 of FIG. 1 or the display device 230 of FIG. 2. Additionally, the computer system 700 may include an input device 712, such as a keyboard, a remote control device (e.g., the remote control device 170 of FIG. 1), and a cursor control device 714 (e.g., a mouse). The computer system 700 can also include a disk drive unit 716, a signal generation device 718, such as remote control device (e.g., the remote control device 170 of FIG. 1), and a network interface device 720.

In a particular embodiment, as depicted in FIG. 7, the disk drive unit 716 may include a tangible (i.e., non-transitory) computer-readable medium 722 in which one or more sets of instructions 724, e.g., software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by the computer system 700. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a tangible computer-readable medium that includes instructions 724 or receives and executes instructions 724, so that a device connected to a network 726 can communicate audio, video or data over the network 726. Further, the instructions 724 may be transmitted or received over the network 726 via the network interface device 720.

The term "computer-readable medium" or "processor-readable medium" may include a single medium or multiple media, such as a centralized or distributed database, and/or associated caches and servers that store one or more sets of instructions. The term "computer-readable medium" or "processor-readable medium" may refer to any non-transitory, tangible, medium that is capable of storing or encoding a set of instructions 724 for execution by the processor 702 or that cause the computer system 700 to perform any one or more of the methods or operations disclosed herein.

In a particular non-limiting, exemplary embodiment, the computer-readable medium can include a solid-state memory, such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable storage medium and other equivalents and successor media, in which data or instructions may be stored.

Software (e.g., the instructions 724) that implement the disclosed methods may be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosure is not limited to such standards and protocols. For example, standards for Internet, other packet switched network transmission (e.g., TCP/IP, UDP/IP, HTML, HTTP, and Internet Group Management Protocol (IGMP)) and standards for encoding or viewing media content (e.g., MPEG, SMPTE, SVC and H.264) represent examples of the state of the art. Such standards may occasionally be superseded by faster or more efficient equivalents having substantially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a server, channel change request data from a media device, wherein the channel change request data specifies a requested channel that is associated with a plurality of multimedia streams, wherein each multimedia stream of the plurality of multimedia streams has a corresponding content format, and wherein the channel change request data indicates that a multimedia stream of the plurality of multimedia streams is to be recorded by a digital video recorder associated with the media device;
   determining, at the server, an available bandwidth of a service to a premises associated with the media device;
   receiving data at the server, the data corresponding to an available storage space at the digital video recorder;
   selecting, at the server, a particular content format based on the available bandwidth and based on the data;
   determining whether the particular content format matches a requested content format indicated in the channel change request data;
   selecting, at the server, a particular multimedia stream of the plurality of multimedia streams that has the particular content format;
   sending an identification of the particular multimedia stream to the media device from the server; and
   in response to the particular content format not matching the requested content format, sending an explanation message to the media device that indicates that the particular content format is other than the requested content format.

2. The method of claim 1, wherein determining the available bandwidth includes receiving second data corresponding to the available bandwidth from a residential gateway associated with the premises.

3. The method of claim 1, wherein determining the available bandwidth includes receiving second data corresponding to the available bandwidth from the media device.

4. The method of claim 1, further comprising receiving second data corresponding to an output setting of the media device, wherein the particular content format is selected based on the second data.

5. The method of claim 4, wherein the output setting corresponds to a highest content format capability of a display device coupled to the media device.

6. The method of claim 4, wherein the output setting corresponds to a content format that is less than a highest content format capability of a display device coupled to the media device.

7. The method of claim 4, wherein the output setting is one of a standard definition output setting, a high-definition output setting, and a three-dimensional output setting.

8. The method of claim 1, further comprising receiving second data corresponding to processing capabilities of the media device, wherein the particular content format is selected based on the second data.

9. The method of claim 1, wherein the service includes an internet protocol television service, a cable television service, or a satellite television service.

10. The method of claim 1, wherein the available bandwidth corresponds to a number of standard definition multimedia streams concurrently accessible via the service, a number of high definition multimedia streams concurrently accessible via the service, a number of three-dimensional multimedia streams concurrently accessible via the service, or any combination thereof.

11. The method of claim 1, wherein the identification includes a multicast address.

12. The method of claim 1, wherein the digital video recorder is a component of the media device.

13. The method of claim 1, wherein the explanation message includes a reason that the particular content format was selected.

14. A system comprising:
a processor;
a memory coupled to the processor, the memory storing instructions executable by the processor to perform operations including:
receiving channel change request data from a media device, wherein the channel change request data specifies a requested channel that is associated with a plurality of multimedia streams, wherein each multimedia stream of the plurality of multimedia streams has a corresponding content format, and wherein the channel change request data indicates that a multimedia stream of the plurality of multimedia streams is to be recorded by a digital video recorder associated with the media device;
determining an available bandwidth of a service to a premises associated with the media device;
receiving data, the data corresponding to an available storage space at the digital video recorder;
selecting a particular content format based on the available bandwidth and based on the data;
determining whether the particular content format matches a requested content format indicated in the channel change request data;
selecting a particular multimedia stream of the plurality of multimedia streams that has the particular content format;
sending an identification of the particular multimedia stream to the media device; and
in response to the particular content format not matching the requested content format, sending an explanation message to the media device that indicates that the particular content format is other than the requested content format.

15. The system of claim 14, wherein determining the available bandwidth includes receiving second data corresponding to the available bandwidth from a residential gateway associated with the premises or from the media device.

16. A computer-readable storage device storing instructions executable by a processor to perform operations comprising:
sending channel change request data to a content proxy server, wherein the channel change request data specifies a requested channel that is associated with a plurality of multimedia streams, wherein each multimedia stream of the plurality of multimedia streams has a corresponding content format, and wherein the channel change request data indicates that a multimedia stream of the plurality of multimedia streams is to be recorded by a digital video recorder associated with the processor;
sending data corresponding to an available storage space at the digital video recorder to the content proxy server;
receiving identification of a particular multimedia stream of the plurality of multimedia streams in response to sending the channel change request data and the data, the particular multimedia stream associated with a particular content format; and
in response to the particular content format not matching a content format associated with the channel, receiving an explanation message that indicates that the particular content format is other than the content format.

17. The computer-readable storage device of claim 16, wherein the operations further comprise sending the explanation message to a display device.

18. The computer-readable storage device of claim 17, wherein the operations further comprise:
receiving user input in response to the explanation message to enable retrieval of a second multimedia stream corresponding to the requested channel, wherein the second multimedia stream has the content format; and
sending a request for the second multimedia stream to a distribution network.

19. The computer-readable storage device of claim 16, wherein the operations further comprise sending a request for the particular multimedia stream to a distribution network based on the identification.

20. The computer-readable storage device of claim 19, wherein the operations further comprise:
receiving the particular multimedia stream from the distribution network; and
sending processed media content generated from the particular multimedia stream to an output device.

* * * * *